United States Patent [19]

Morimitu et al.

[11] Patent Number: 4,976,998
[45] Date of Patent: Dec. 11, 1990

[54] METHOD AND APPARATUS FOR COATING SHEAR-STAKED PERIPHERAL PORTIONS OF COATED SHELL

[75] Inventors: Yasumasa Morimitu; Shinichi Yamashita, both of Higashimatsuyama, Japan

[73] Assignee: Jidosha Kiki Co., Ltd., Tokyo, Japan

[21] Appl. No.: 321,738

[22] Filed: Mar. 10, 1989

[30] Foreign Application Priority Data

Mar. 25, 1988 [JP] Japan .................................. 63-71118

[51] Int. Cl.$^5$ .......................... B05D 5/00; B05D 1/18; B05C 3/00
[52] U.S. Cl. ..................................... 427/284; 427/286; 427/430.1; 427/435; 118/416; 118/503
[58] Field of Search ................ 118/416, 503, DIG. 12; 427/284, 286, 430.1, 435

[56] References Cited

U.S. PATENT DOCUMENTS

| | | | |
|---|---|---|---|
| 2,195,671 | 4/1940 | Ferngren | 427/284 |
| 3,158,930 | 12/1964 | Wesstrom et al. | 29/510 |
| 4,296,680 | 10/1981 | Ohta et al. | 92/98 D |
| 4,794,849 | 1/1989 | Kobayashi | 92/98 D |
| 4,811,653 | 3/1989 | Kobayashi et al. | 92/98 D |

FOREIGN PATENT DOCUMENTS

| | | | |
|---|---|---|---|
| 2134012 | 8/1984 | United Kingdom | 118/416 |
| 2165168 | 4/1986 | United Kingdom | 427/430.1 |

OTHER PUBLICATIONS

U.S. Ser. No. 315,807 entitled Booster, (9 pages of text and 2 pages of drawings).

Primary Examiner—Evan Lawrence
Attorney, Agent, or Firm—Flynn, Thiel, Boutell & Tanis

[57] ABSTRACT

A method and apparatus for providing to an anti-rust treatment a peripheral portion a shell such as is associated with a brake booster and which comprises a pair of cylindrical members disposed in abutting relationship with each other and fastened together by a staking operation which occurs by applying a shearing action to the periphery of the abutting members at a plurality of locations. The substantially cylindrical shell is held at an angle with respect to the horizontal, and then driven for rotation. A vehicle containing an anti-rust paint is disposed below the rotating shell, and the shell is positioned so that its axis of rotation does not intersect the vessel. As the shell rotates, the shear-staked peripheral portion of the shell is successively brought into dipping relationship with the paint.

5 Claims, 2 Drawing Sheets

F I G. 1
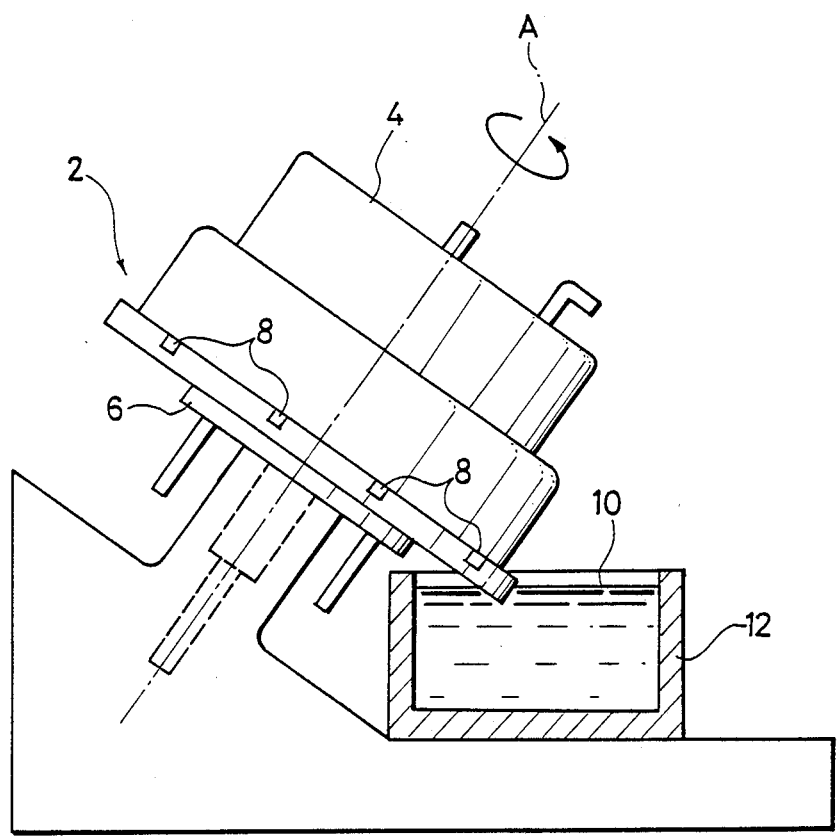

METHOD AND APPARATUS FOR COATING SHEAR-STAKED PERIPHERAL PORTIONS OF COATED SHELL

BACKGROUND OF THE INVENTION

The invention relates to a method and apparatus for depositing or applying a paint to an outer peripheral portion of shell such as is associated with a brake booster which is formed by staking or caulking a pair of cylindrical or circular members together.

A shell as used in a brake booster generally comprises a cup-shaped member or a cylindrical member having a closed bottom and a disc-shaped or dish-shaped member, which are coated and dried before they are assembled together and which are then disposed in abutment against each other so that a generally circular peripheral portion of the abutting members are subject to a shearing action, thus staking both members together.

It will be noted that a portion which has been subjected to a shear-staking operation has its metal exposed which may cause rust. Accordingly, a paint is applied to provide an anti-rust treatment, which has been performed manually in the prior art practice. This results in a degraded operational efficiency and presents difficulty in achieving a uniform coating.

SUMMARY OF THE INVENTION

Therefore, it is an object of the invention to provide a method of and an apparatus for coating a shear-staked peripheral portion of a shell which enables the efficient application of an anti-rust paint in a reduced length of time while assuring a uniform coating of the paint.

The above object is accomplished in accordance with the invention by holding a substantially cylindrical shell in a position in which the axis of the shell is at an angle with respect to the horizontal, disposing a vessel containing a paint below the shell, which is held in this position in a manner such that a shear-staked peripheral portion thereof may be dipped into the paint, and rotating the shell.

BRIEF DESCRIPTION OF THE DRAWINGS

FIG. 1 is a schematic illustration of a coating method according to one embodiment of the invention.

DESCRIPTION OF EMBODIMENTS

Figure 2:
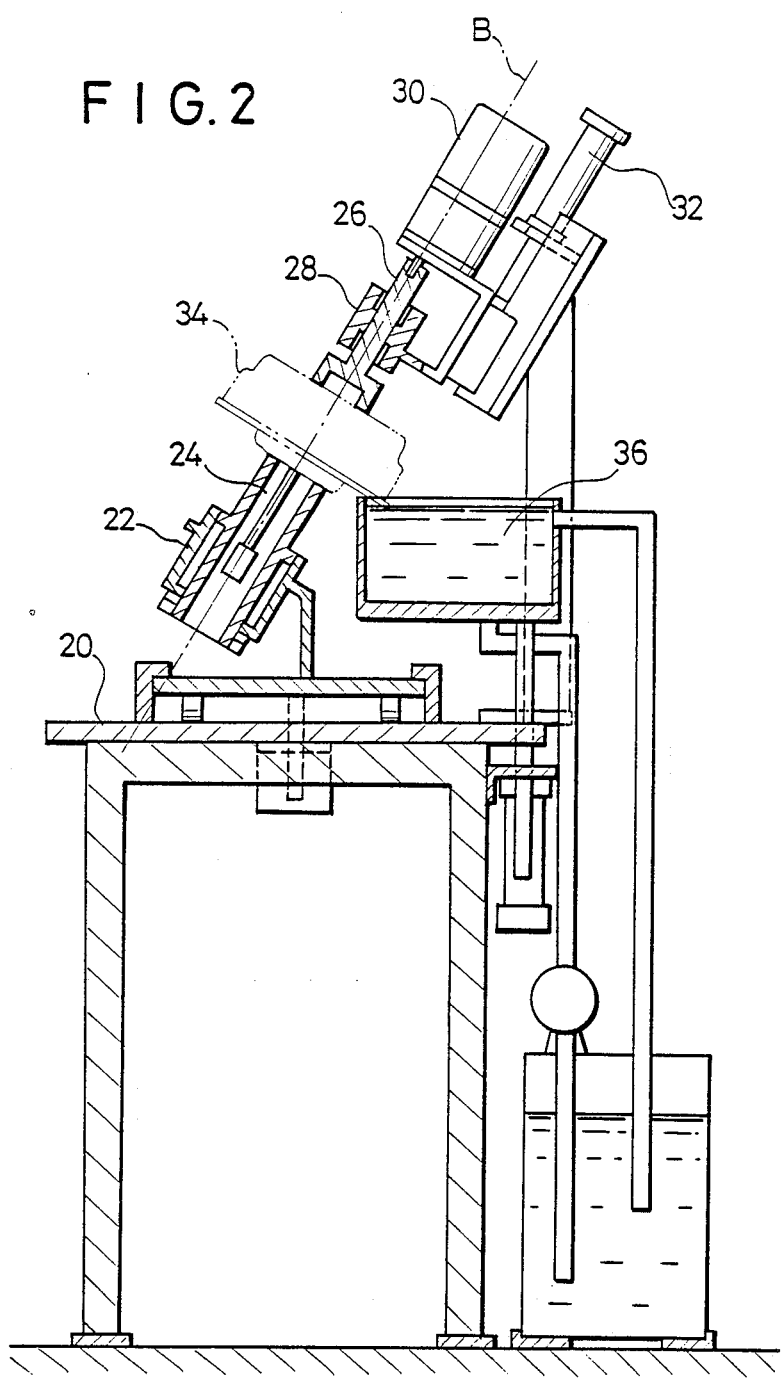
FIG. 2 is a front view, partly in section, of a coating apparatus according to another embodiment of the invention.

Referring to the drawings, embodiments of the invention will now be described. Referring to FIG. 1, a method according to one embodiment of the invention will be described. A brake booster includes a shell 2 comprising a cup-shaped, first member 4 or a substantially cylindrical member with a closed bottom, and a disc-shaped, second member 6. Before assembly, both members 4, 6 are individually coated, and then the second member 6 is fitted into an opening formed in the first member 4 and is fastened thereto by applying a shearing action around the opening at a plurality of locations from the outside and staking both members together.

In the method of the embodiment, the shell 2 is held in a position in which its axis A is at an angle with respect to the horizontal, a vessel 12, containing a quantity of paint 10, is disposed so that a region around the outer periphery of the shell, which is located below the shear-staked portion 8, can be dipped into the paint 10, and the shell 2 is rotated about its axis A. Thereupon, each staked portion 8 will once rotate into the paint 10 in the vessel 12 and is then moved out of the paint, thus allowing the paint 10 to be uniformly deposited around all the staked portions in a reduced length of time.

FIG. 2 is an apparatus which may be used to carry out the method of the described embodiment. Specifically, a bearing 22 is disposed at an angle on top of a table 20 for rotatably supporting a lower shaft 24. An upper shaft 26 is aligned with the axis B of the lower shaft 24 and is supported by another bearing 28. The upper shaft 26 is disposed for rotation as it is driven by rotating means, such as a motor 30, and is also disposed for axial displacement as it is driven by reciprocating means such as a cylinder 32. The shaft 26 is driven upward along the axis B, and the axis B of the upper shaft 26 is brought into alignment with the axis of a shell 34 of a brake booster, whereupon the upper shaft 26 is driven downward to hold the shell 34 sandwiched between shafts 24, 26. Alternatively, the lower shaft 24 may be driven for rotation.

A vessel 36 containing paint is disposed so that a lowermost portion of the shell 34, which is held between shafts 24, 26 in the manner mentioned above, can be submerged into the paint. When the upper shaft 26 is driven for rotation, the shell 34, held between shafts 26, 24, is set in motion, whereby a peripheral portion of the shell, along which a plurality of shear-staked areas are formed, is successively brought into dipping relationship with the paint contained in the vessel 36, thus coating the staked areas.

Having described the invention in terms of several embodiments thereof, it should be understood that a number of changes, modifications and substitutions will readily occur to one skilled in the art therein without departing from the scope and spirit of the invention as defined by the appended claims.

What is claimed is:

1. A method of coating a shear-staked peripheral portion of a substantially cylindrical coated shell, said coated shell comprising a pair of members having peripheral regions disposed in abutting relationship and being fastened together by staking them together by the application of a shearing action to the peripheral abutting regions, the method comprising the steps of: disposing a vessel containing a quantity of a coating material such that a shear-staked peripheral portion of the shell can be dipped into the coating material; positioning said shell such that it has an axis of rotation that is disposed at an angle with respect to the horizontal but does not intersect with the vessel and said shear-staked peripheral portion is in contact with said coating material; and rotating the shell about the axis of rotation so that the coating material is deposited on the entire shear-staked peripheral portion of the shell.

2. An apparatus for coating a shear-staked portion of a substantially cylindrical coated shell which includes a pair of members disposed in abutment against each other and are then fastened together by staking them together by applying a shearing action to the periphery of abutting regions of both members; the apparatus comprising means for holding the shell so that the axis thereof is disposed at an angle with respect to the horizontal, the holding means holding the shell from the opposite sides thereof along the axis, means for rotating the holding means about the axis of the shell, and a vessel containing a paint which is disposed so that a lowermost staked portion of the shell, which is maintained at said angle, can be dipped into the paint.

3. An apparatus according to claim 2 in which the holding means comprises an upper member and a lower member which are disposed on a common axis which is at said angle with respect to the horizontal.

4. An apparatus according to claim 3 in which the upper member is displaceable along the axis.

5. An apparatus according to claim 3 in which the upper member is driven for rotation by rotating means.

* * * * *